(12) United States Patent
Windhaber

(10) Patent No.: US 11,253,057 B2
(45) Date of Patent: Feb. 22, 2022

(54) ADJUSTABLE LIFTING COLUMN AND ADJUSTABLE TABLE SYSTEM

(71) Applicant: LOGICDATA Electronic & Software Entwicklungs GmbH, Deutschlandsberg (AT)

(72) Inventor: Stefan Windhaber, Graz (AT)

(73) Assignee: REACTIVE REALITY GMBH, Graz (AT)

( * ) Notice: Subject to any disclaimer, the term of this patent is extended or adjusted under 35 U.S.C. 154(b) by 0 days.

(21) Appl. No.: 17/263,349

(22) PCT Filed: Aug. 8, 2019

(86) PCT No.: PCT/EP2019/071362
§ 371 (c)(1),
(2) Date: Jan. 26, 2021

(87) PCT Pub. No.: WO2020/030758
PCT Pub. Date: Feb. 13, 2020

(65) Prior Publication Data
US 2021/0321760 A1   Oct. 21, 2021

(30) Foreign Application Priority Data
Aug. 9, 2018   (DE) .................... 10 2018 119 426.9

(51) Int. Cl.
*A47B 9/04*    (2006.01)
*A47B 9/20*    (2006.01)
*A47B 21/02*   (2006.01)

(52) U.S. Cl.
CPC .................. *A47B 9/04* (2013.01); *A47B 9/20* (2013.01); *A47B 21/02* (2013.01)

(58) Field of Classification Search
CPC .. A47B 9/04; A47B 9/20; A47B 21/02; A47B 2009/046
See application file for complete search history.

(56) References Cited

U.S. PATENT DOCUMENTS 6,131,870 A * 10/2000 Tseng ........................ A47B 9/04
108/147
2003/0183027 A1  10/2003 Koch
(Continued)

FOREIGN PATENT DOCUMENTS

EP      1230872 A1    8/2002

OTHER PUBLICATIONS

International Search Report dated Oct. 4, 2019 in connection with PCT/EP2019/071362.

*Primary Examiner* — Daniel J Rohrhoff
(74) *Attorney, Agent, or Firm* — Eschweiler & Potashnik, LLC

(57) ABSTRACT

An adjustable lifting column for adjusting a piece of furniture comprises a drive assembly, a threaded spindle assembly comprising at least two concentrically arranged threaded spindles, of which an outer threaded spindle concentrically surrounds at least one further threaded spindle, a telescopic tube assembly comprising three concentrically arranged telescopic tubes, and a driver mechanism having an internal thread. The threaded spindle assembly is located within the telescopic tube assembly. Two adjacent threaded spindles of the threaded assembly have a common threaded connection. One of the at least two threaded spindles in the threaded spindle assembly is connected to the drive assembly for driving this one threaded spindle. The outer threaded spindle also has an external thread in which the internal thread of the driver mechanism engages. The driver mechanism is connected to a middle telescopic tube of the three telescopic tubes.

16 Claims, 5 Drawing Sheets

(56) References Cited

U.S. PATENT DOCUMENTS

| | | | |
|---|---|---|---|
| 2014/0013878 A1 | 1/2014 | Kollreider | |
| 2017/0051869 A1* | 2/2017 | Hsiao | F16M 11/18 |
| 2018/0140087 A1* | 5/2018 | Wu | F16H 25/2056 |
| 2018/0171288 A1* | 6/2018 | Noble | A61K 31/138 |
| 2018/0172062 A1* | 6/2018 | Hu | H02K 5/24 |
| 2018/0184799 A1* | 7/2018 | Lin | A47B 9/04 |
| 2019/0357668 A1* | 11/2019 | Knudtson | A47B 9/20 |
| 2019/0360567 A1* | 11/2019 | Hu | B66F 3/44 |
| 2020/0085184 A1* | 3/2020 | Lu | A47B 9/04 |
| 2020/0214439 A1* | 7/2020 | Bennett | A47B 9/20 |
| 2021/0112970 A1* | 4/2021 | Polz | F16H 25/2056 |

* cited by examiner

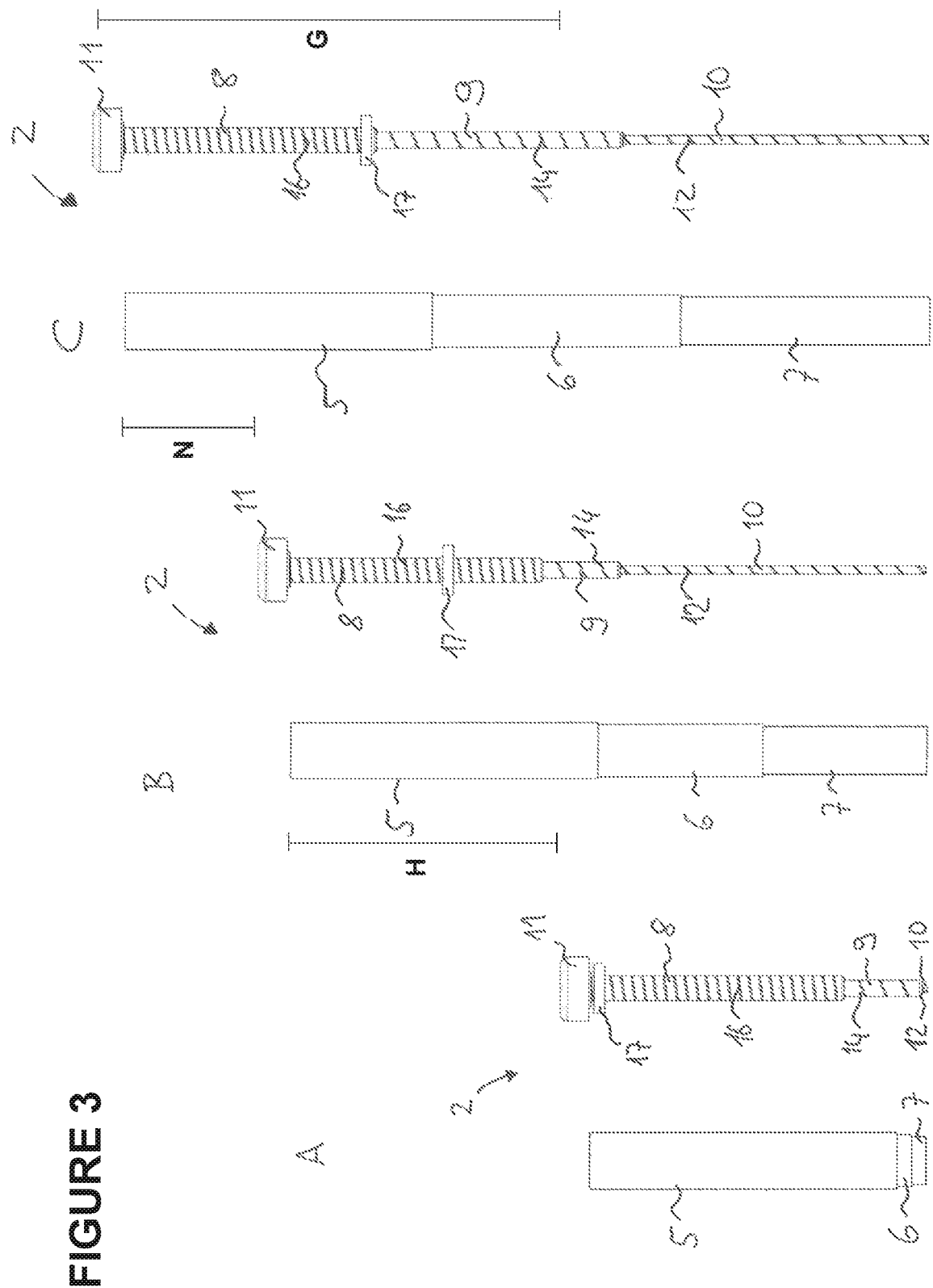

ADJUSTABLE LIFTING COLUMN AND ADJUSTABLE TABLE SYSTEM

REFERENCE TO RELATED APPLICATIONS

This application is a National Phase entry application of International Patent Application No. PCT/EP2019/071362 filed Aug. 8, 2019, which claims priority to DE 10 2018 119 426.9 filed on Aug. 9, 2018, the contents of which are herein incorporated by reference in its entirety.

The present invention concerns an adjustable lifting column for adjusting a piece of furniture and an adjustable table system with at least one such lifting column.

BACKGROUND

Lifting columns for adjusting pieces of furniture are sometimes heavily and frequently stressed. In table systems, for example, such lifting columns are used to move a working height of the table system between a sitting and a standing position of a user, or to adjust according to a body height of the user in the respective position. An important requirement of such lifting columns is to adjust a piece of furniture as smoothly and quietly as possible. This protects the material and components of the lifting column and the piece of furniture, but also equipment that is arranged on the piece of furniture—in the case of table systems, for example, monitors, etc. Low-noise adjustment is particularly desirable when such furniture is used in environments where noise pollution is to be kept low, for example in open-plan offices.

SUMMARY

An adjustable lift column for adjusting a piece of furniture comprises a drive assembly and a threaded spindle assembly comprising at least two concentrically arranged threaded spindles, of which an outer threaded spindle concentrically surrounds at least one further threaded spindle. The adjustable lifting column further comprises a telescopic tube assembly comprising three concentrically arranged telescopic tubes and the adjustable lifting column further comprises a driver mechanism with an internal thread. The threaded spindle assembly is located within the telescopic tube assembly. Each two adjacent threaded spindles of the threaded spindle assembly have a common threaded connection. One of the at least two threaded spindles in the threaded spindle assembly is connected to the drive assembly for driving this one threaded spindle. The outer threaded spindle also has an external thread that engages the internal thread of the driver mechanism. The driver mechanism is connected to a middle telescopic tube of the three telescopic tubes.

By driving one of the at least two threaded spindles with the drive assembly, the at least two threaded spindles are moved with respect to each other by means of the at least one common threaded connection. This changes a height of the lifting column. The telescopic tubes are mounted in such a way that, together with the movement of the threaded spindles, they are moved relative to each other. By means of the driver mechanism, which is connected to the middle telescopic tube and engages in the external thread of the outer threaded spindle, the three telescopic tubes are moved simultaneously. In this way, a smooth, low-noise and visually appealing movement of the lifting column is made possible.

In particular, an outer telescopic tube of the three telescopic tubes may be fixed to a first end of the threaded spindle assembly and an inner telescopic tube of the three telescopic tubes may be fixed to a second end of the threaded spindle assembly, the second end being opposite the first end. The middle telescopic tube is movable along the threaded spindle assembly relative to the threaded spindle assembly. By fixing the inner and outer telescopic tubes to opposite ends of the lifting column, the inner and outer telescopic tubes are moved relative to each other as the lifting column is adjusted. The middle telescopic tube is moved along the threaded spindle assembly by the driver mechanism that engages the external thread of the outer threaded spindle.

In at least one embodiment, the threaded spindle assembly comprises exactly three concentrically arranged threaded spindles. The threaded connection between the outer and a middle threaded spindle has a different efficiency than the threaded connection between the middle and an inner threaded spindle.

This allows the threaded spindle assembly to be moved sequentially by first moving the threaded connection with the higher efficiency when driving one of the three threaded spindles with the drive assembly and, as soon as this threaded connection with the higher efficiency reaches a stop, then moving the threaded connection with the lower efficiency when maintaining a drive direction of the drive assembly. In addition, the three-spindle design allows a smaller minimum height of the lifting column for the same total stroke than a two-spindle design.

As long as the threaded connection with the higher efficiency has not yet reached the stop, only the threaded connection with the higher efficiency is moved. The threaded connection with the lower efficiency remains stationary while the threaded connection with the higher efficiency is being moved, even if the threaded connection with the lower efficiency is not held by a stop or other locking device. Such a mechanism is described, for example, in patent application DE 102017127937. The content of this patent application is fully incorporated into this application by reference.

For example, a total stroke of the lifting column is divided into a main and a secondary stroke. The main stroke can be adjusted by moving the threaded connection with the higher efficiency and the secondary stroke by moving the threaded connection with the lower efficiency. The main stroke and the secondary stroke separately each have a higher efficiency than if both threaded connections were moved in opposite directions at the same time.

For example, moving the first threaded connection adjusts the main stroke, and moving the second threaded connection adjusts the secondary stroke. Since the main stroke is adjusted via the threaded connection with the higher efficiency, less power is required to adjust the main stroke. Therefore, less power is required for the same load and the adjustment of the lifting column is more energy efficient. This allows the use of less expensive power electronics, which reduces the manufacturing costs. It would also be possible to allow an adjustment of the secondary stroke only when a load pressuring onto the lifting column is low, while adjusting the main stroke also is possible when at full load.

For example, a lifting height of the secondary stroke is at most as large as a lifting height of the main stroke. In particular, the lifting height of the secondary stroke can be significantly smaller than that of the main stroke. For example, the lifting height of the secondary stroke is a quarter or less of the lifting height of the main stroke.

According to at least one embodiment, a thread pitch of the external thread of the outer threaded spindle relates to a thread pitch of the common threaded connections of the concentrically arranged threaded spindles according to a ratio in a range of 1:1.5 to 1:4, in particular according to a ratio of 1:2.

This allows a substantially even movement of the three telescopic tubes. With a ratio of the above-mentioned thread pitches with respect to each other of 1:2, the threaded spindles move relative to each other twice as fast as the driver mechanism with the middle telescopic tube relative to the outer threaded spindle.

If the outer telescopic tube is fixed at a first end of the threaded spindle assembly and the inner telescopic tube is fixed at an opposite end of the threaded spindle assembly, a result is also that the outer telescopic tube is moved relative to the inner telescopic tube twice as fast as the middle telescopic tube relative to the inner telescopic tube.

Moreover, the threads of all the threaded spindles have a same orientation, i.e., the threads of the threaded connections and the external thread of the outer threaded spindle have the same pitch direction, the driver mechanism is moved relative to the outer threaded spindle along the outer threaded spindle in a direction opposite to a direction of movement of the outer threaded spindle along the lifting column. This causes an even, synchronous movement of the telescopic tubes relative to each other. In other words, a relative velocity of the outer telescopic tube with respect to the middle telescopic tube is approximately identical to a relative velocity of the middle telescopic tube with respect to the inner telescopic tube. This synchronous movement produces a smooth movement of the telescopic tubes.

The drive assembly includes, for example, an electric motor and a gear for driving the driven threaded spindle. In this way, the lifting column can be adjusted electrically and, compared to conventional double-stage drives, large loads can be moved with comparatively low-power and economical electric motors. Alternatively or additionally, a crank handle can be used in the drive assembly to manually adjust the lifting column.

Alternatively, the drive assembly includes an electric motor for direct drive of the driven threaded spindle. In this case, in particular, the electric motor drives the driven threaded spindle without a gear. For example, the electric motor is a so-called axial flux motor, a direct current, DC, motor or a brushless DC motor.

The omission of a gearbox allows a space-saving design of the drive assembly. In this way, more space is available in the lifting column for the threaded spindle assembly, and thus a higher total stroke of the lifting column is available. Axial flux motors, in particular, generate a high torque and are therefore suitable for driving the driven threaded spindle, even without using a gear unit. In addition, wear and tear of the lifting column is reduced, since gears in particular are subject to heavy wear and tear. Furthermore, a direct drive provides a smooth and even run of the adjustable lifting column, especially when starting and stopping the height adjustment.

For example, the lifting column is designed to move a load of less than 100 kg. In addition, the threaded spindle assembly has, for example, a spindle diameter of less than 40 mm. Such a lifting column is particularly suitable for use in furniture, especially tables, such as work desks. Such lifting columns can also be used for adjustable beds or adjustable seating furniture.

For example, a flexible element is arranged between the driver mechanism and the middle telescopic tube, which at least partially compensates for a tilting of the middle telescopic tube. In this way, tilting of the middle telescopic tube, caused for example by a user or other object touching the lifting column, is not transmitted to the driver mechanism. The flexible element keeps the position of the middle telescopic tube at a constant distance from the driver mechanism. This prevents the driver mechanism from jamming on the external thread of the outer threaded spindle and prevents a resulting increased friction thereof.

Further advantageous embodiments are described in the attached claims and in the following description of embodiments using the attached figures. In the figures, the same reference symbols are used for elements with essentially the same function, but these elements do not have to be identical in every detail. Elements with the same reference signs are sometimes only described in detail when they first appear in the figures. These descriptions apply analogously to the other figures.

BRIEF DESCRIPTION OF THE DRAWINGS

In the Figures:

FIG. 3 shows three different states of an electrically adjustable lifting column.

DETAILED DESCRIPTION

Figure 1:
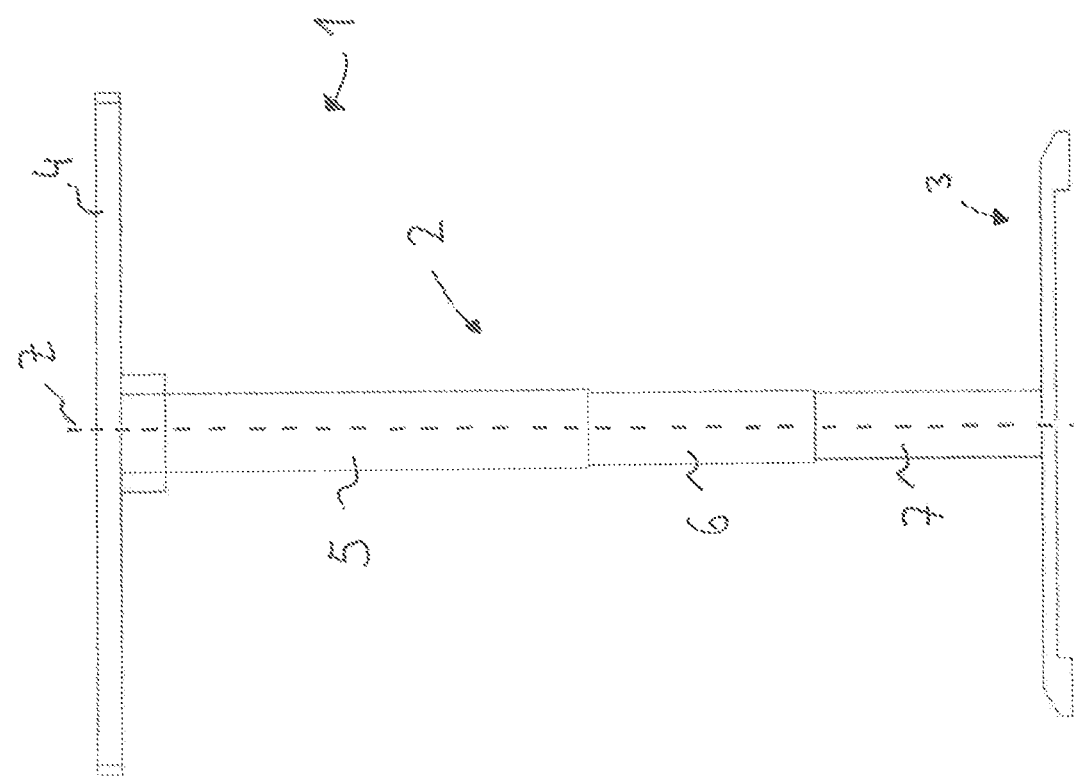
FIG. 1 shows an exterior side view of an electrically adjustable table according to one embodiment.

FIG. 1 shows a side view of an electrically adjustable table 1 with a lifting column 2. The lifting column 2 is placed between a table foot 3, with which the table 1 is placed on a floor, and a table top 4. The lifting column 2 is electrically adjustable and forms a height-adjustable table leg of the adjustable table 1.

Visible from the outside are an outer telescopic tube 5, a middle telescopic tube 6 and an inner telescopic tube 7. The three telescopic tubes 5, 6, 7 are arranged concentrically to each other and can be moved relative to each other along a middle axis Z of the lifting column 2. The telescopic tubes 5, 6, 7 form a telescopic tube assembly of the lifting column 2. A height of the lifting column 2 is adjusted by means of a threaded spindle assembly, which is described with respect to the following figures.

In this embodiment, the outer telescopic tube 5 faces the table top 4, the inner telescopic tube 7 faces the table foot 3, and the middle telescopic tube 6 is spaced from the table foot 3 and the table top 4 by the inner telescopic tube 7 and the outer telescopic tube 5. An alternative arrangement of the telescopic tubes 5, 6, 7, for example with the outer telescopic tube 5 facing the table foot 3 and the inner telescopic tube 7 facing the table top 4, is of course possible.

One end of the outer telescopic tube 5 facing the table top 4 is attached to a lower side of the table top 4. One end of the inner telescopic tube 7 facing the table foot 3 is attached to the table foot 3. The inner telescopic tube 7 can be described as stationary in relation to a floor on which the table with the table foot 3 stands. When a height of the lifting column 2 is adjusted, the outer telescopic tube 5 moves together with the table top 4. When the height of the lifting column is adjusted, the middle telescopic tube 6 moves relative to both the inner telescopic tube 7 and the outer telescopic tube 5. A movement mechanism used for this purpose is explained in more detail with respect to the following figures.

As an alternative to the embodiment shown here, the lifting column 2, i.e. the end of the outer telescopic tube 5 facing the table top 4, can also be attached to a table frame that supports the table top 4. With a modified sequence of the telescopic tubes 5, 6, 7, corresponding parts of the telescopic tubes 5, 6, 7 are attached to the table foot 3, the table top 4, or the table frame.

The telescopic tubes 5, 6, 7 can be designed in any form. For example the telescopic tubes 5, 6, 7 have a rectangular profile. In this case, guide elements can be attached to the telescopic tubes 5, 6, 7, which ensure that the telescopic tubes 5, 6, 7 are guided when the lifting column 2 is adjusted and, with respect to the center axis Z, prevent or minimize a twisting or tilting of the telescopic tubes 5, 6 7 relative to each other. Alternatively, the telescopic tubes 5, 6, 7 can also have cylindrical profiles. In this case, for example, guide rails are used to guide the telescopic tubes 5, 6, 7 in each other and to prevent the telescopic tubes 5, 6, 7 from twisting or tilting relative to each other.

Figure 2:
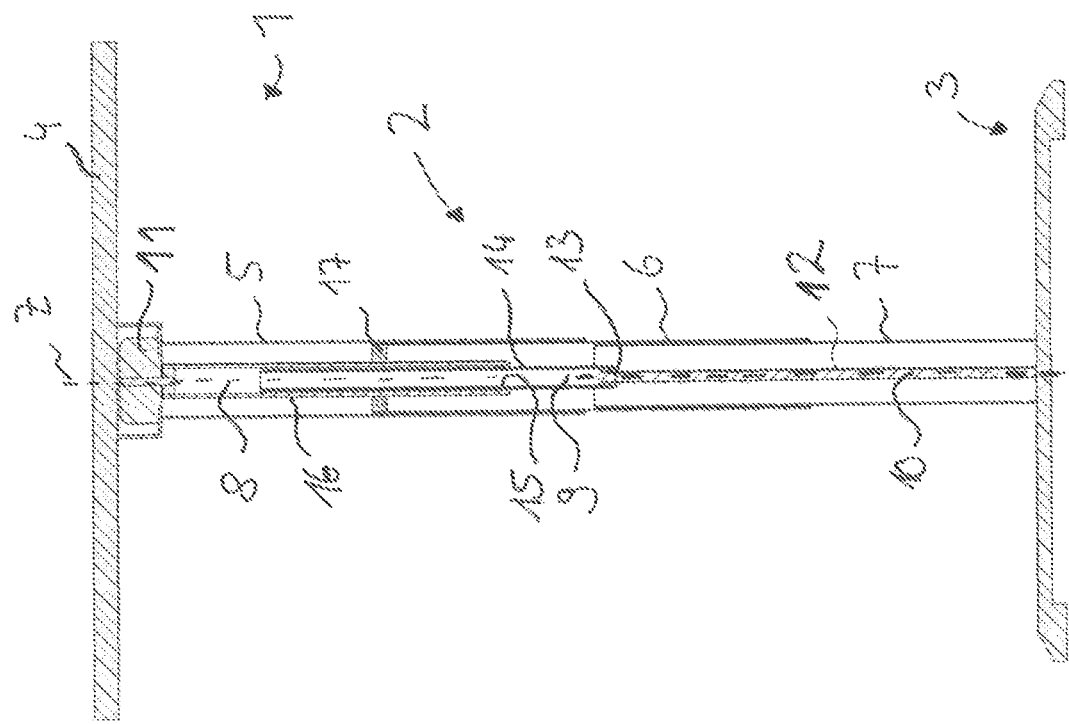
FIG. 2 shows a sectional side view of the electrically adjustable table according to FIG. 1.

FIG. 2 shows a sectional side view of the electrically adjustable table 1 according to FIG. 1. Inside the telescopic tubes 5, 6, 7, an outer threaded spindle 8, a middle threaded spindle 9 and an inner threaded spindle 10 are visible in this FIG. 2. The threaded spindles 8, 9, 10 form the threaded spindle assembly of the lifting column 2, which is used to adjust the height of the lifting column 2. The threaded spindles 8, 9, 10 are arranged concentrically to each other. The threaded spindles 8, 9, 10 are also arranged concentrically to the telescopic tubes 5, 6, 7.

A lower end of the inner threaded spindle 10 is connected to the table foot 3, an upper end of the outer threaded spindle 8 is connected to an electric motor 11. The motor 11 is attached to the bottom of the table top 4, in the end of the lifting column 2 facing the table top 4. The motor 11 drives the outer threaded spindle 8 directly, i.e. without a gear. Alternatively, the motor 11 can also be arranged in an end of the lifting column 2 facing the table foot 3. It is also possible to arrange the motor 11 in the table top 4 or the table foot 3 and to connect it to the lifting column 2 only via a motor axis.

The inner threaded spindle 10, in this embodiment a solid spindle, has a first external thread 12. The middle threaded spindle, in this example a hollow spindle, has a first internal thread 13 and a second external thread 14. The outer threaded spindle 8, in this example also a hollow spindle, has a second internal thread 15 and a third external thread 16. The first external thread 12 and the first internal thread 13 form a first threaded connection, the second external thread 14 and the second internal thread 15 form a second threaded connection. The first threaded connection is thus located between the inner threaded spindle 10 and the middle threaded spindle 9, the second threaded connection is located between the middle threaded spindle 9 and the outer threaded spindle 8.

The first threaded connection has a higher efficiency than the second threaded connection. The efficiency of a thread decreases among others with increasing thread diameter by a function of 1/x and with decreasing thread pitch by a linear function. This contributes to the fact that the efficiency of the first threaded connection is higher than the efficiency of the second threaded connection, because the first external thread 12 of the internal threaded spindle 10 has a smaller diameter than the second external thread 14 of the middle threaded spindle 9. The efficiency directly influences the required drive torque.

In this embodiment, the inner threaded spindle 10 is fixed in relation to a floor on which the table 1 stands. When a height of the lifting column 2 is adjusted, the outer threaded spindle 8 moves together with the table top 4 relative to the table foot 3 and the inner threaded spindle 10. When the height of the lifting column 2 is adjusted, the middle threaded spindle 9 either moves together with the outer threaded spindle 8 relative to the inner threaded spindle 10 or is at rest relative to the inner threaded spindle 10 so that only the outer threaded spindle 8 moves relative to the inner threaded spindle 10 and the middle threaded spindle 9. This sequential movement of the threaded spindles 8, 9, 10 is described in detail in the following figures.

FIG. 2 also shows a spindle nut 17 in the lifting column 2. The spindle nut 17 is located internally at one end of the middle telescopic tube 6, concentric with the middle telescopic tube 6.

The spindle nut 17 is non-rotatably connected to the middle telescopic tube 6, i.e. it is basically impossible to turn the spindle nut 17 relative to the middle telescopic tube 6. However, the connection between spindle nut 17 and middle telescopic tube 6 can be designed flexibly with regard to a tilting of the middle telescopic tube 6 to the center axis Z of the lifting column 2. For this purpose, for example, a flexible element not shown here is arranged between the spindle nut 17 and the middle telescopic tube 6. This flexible element can compensate for a tilting of the middle telescopic tube 6 in relation to the center axis Z so that the tilting is not transferred to the spindle nut 17.

The spindle nut 17 engages in the third external thread 16. If only the outer threaded spindle 8 is driven by the motor 11, the outer threaded spindle 8 is rotated relative to The spindle nut 17. The spindle nut 17 is prevented from rotating together with the outer threaded spindle 8 by the rotationally fixed connection of the spindle nut 17 with the middle telescopic tube 6 and the anti-rotation lock of the telescopic tubes 5, 6, 7 among each other. This results in a linear movement of the spindle nut 17 along the middle axis Z relative to the outer threaded spindle 8.

In this embodiment, the inner threaded spindle 10 has a diameter of 12 millimeters, the middle threaded spindle 9 has a diameter of 22 millimeters, and the outer threaded spindle has a diameter of 33 millimeters. The lifting column 2 is arranged to lift a load of 80 kg and is further arranged to be moved at a speed of about 80 millimeters per second. The threaded spindles 8, 9, 10 are made of metal or plastic, for example.

The lifting column 2 shown here has three threaded spindles 8, 9, 10 and three telescopic tubes 5, 6, 7. The threaded spindles 8, 9, 10 can be moved sequentially, while the telescopic tubes 5, 6, 7 can be moved synchronously.

Alternatively, the lifting column 2 can also be made with only, two threaded spindles 8, 10 and the three telescopic tubes 5, 6, 7. In this case, the middle threaded spindle 9 is omitted, i.e. the first external thread 12 of the inner threaded spindle 10 engages with the second internal thread 15 of the outer threaded spindle 8. The remaining construction of the lifting column 2, respectively table 1, corresponds to the embodiment described above. Sequential movement of the threaded spindles 8, 10 is not possible in this case. However, the telescopic tubes 5, 6, 7 are still moved synchronously as described above. In another alternative, four or more threaded spindles are used.

FIG. 3 shows three different states A, B, C of an electrically adjustable lifting column 2, as used for example in table 1 according to the previous figures. For better clarity, FIG. 3 shows the telescopic tubes 5, 6, 7 and the threaded spindles 8, 9, 10, each side by side. In the assembled state of the lifting column 2, the threaded spindles 8, 9, 10 would, of course, be concentrically arranged within the telescopic tubes 5, 6, 7, as described above.

Figure 4:
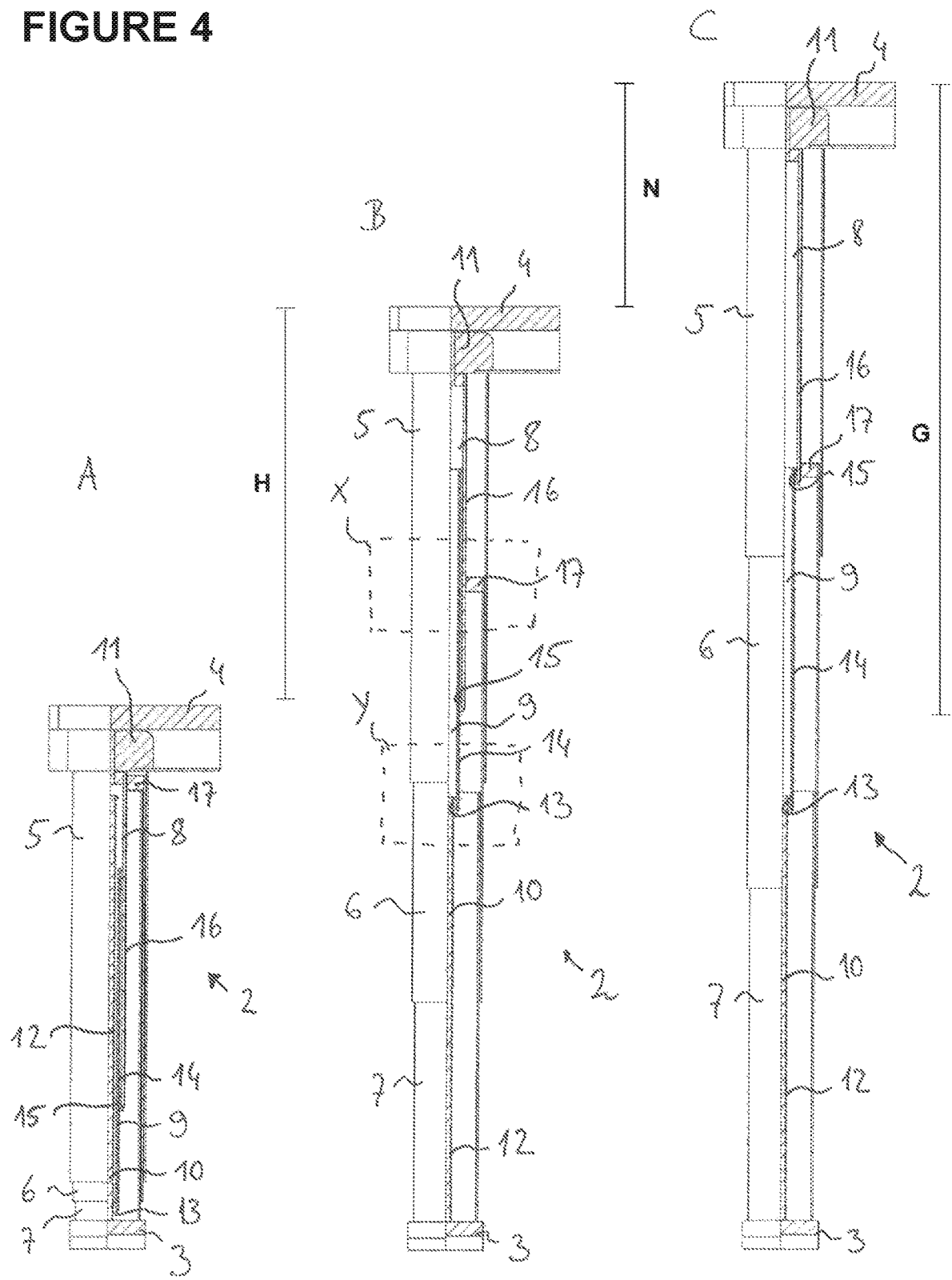
FIG. 4 shows an electrically adjustable lifting column in the three states as shown in FIG. 3 in a half-section.

In state A, the lifting column is completely retracted, i.e. the lifting column 2 takes up the smallest possible height. The middle and the inner telescopic tubes 6, 7 are almost completely covered by the outer telescopic tube 5 in this state A. The inner threaded spindle 10 is almost completely covered by the middle and the outer threaded spindles 8, 9. The middle threaded spindle 9 is largely surrounded by the outer threaded spindle 8. The reason why the middle threaded spindle 9 protrudes beyond the outer threaded spindle 8 in state A at one end of the lifting column 2 facing the table foot 3 is that the inner threaded spindle 10 is longer than the middle threaded spindle 9 and the outer threaded spindle 8. This is shown in FIG. 4.

In this state A, the spindle nut 17 is located at an upper end of the outer threaded spindle 8, the upper end facing the motor 11. The position of the spindle nut 17 corresponds to an upper end of the middle telescopic tube 6, since the spindle nut 17 is attached to its upper end as described above.

If motor 11 is now actuated to extend the lifting column 2, the motor 11 drives the outer threaded spindle 8 and the lifting column 2 moves to state B. When changing from state A to state B, only the first threaded connection between the inner threaded spindle 10 and the middle threaded spindle 9 is moved, but not the second threaded connection between the middle threaded spindle 9 and the outer threaded spindle 8. This is due to the different efficiencies of the first and second threaded connections described above. The lower efficiency of the second threaded connection causes the second threaded connection to remain at rest as long as the first threaded connection has not reached a stop.

In state B, the inner threaded spindle 10 has moved out of the middle threaded spindle 9 up to an upper stop 18. By turning the outer threaded spindle 8 in the spindle nut 17, which is fixed to the middle telescopic tube 6, the spindle nut 17 was moved from state A to state B along the outer threaded spindle 8 in the direction of the table foot 3, since all threads 12, 14, 16 have a same direction, as shown in FIG. 3.

FIG. 3 clearly shows the different thread pitches of the first and second external threads 12, 14 and the third external thread 16. In this embodiment, the thread pitch of the first and second external thread relates to the thread pitch of the third external thread according to a ratio of about 2:1. According to this embodiment, a thread pitch of the third external thread 16 is approximately 1.5 millimeters, whereas the thread pitches of the first and second external threads 12, 14 are approximately 3 millimeters. Thus, a speed of the spindle nut 17 relative to the outer threaded spindle 8 is approximately half the speed of the outer threaded spindle 8 relative to the inner threaded spindle 10. Since the threads 12, 14, 16 are in the same direction, a direction of movement of the spindle nut 17 is opposite to a direction of movement of the outer threaded spindle 8. As a result, the spindle nut 17 moves relative to the inner threaded spindle 10 at approximately half the speed and in the same direction as the outer threaded spindle 8. Furthermore, due to the relatively small thread pitches mentioned here, no brake mechanism is required for the lifting column 2 to prevent an independent movement due to a load on the lifting column 2. The selected thread pitches have a sufficiently large self-locking effect to prevent such movement of the lifting column 2.

As a result, in state B, the inner threaded spindle 10 has moved out of the middle threaded spindle 9 up to the upper stop 18, but the spindle nut 17 has only moved down to just over half of the outer threaded spindle 8. Although the above mentioned thread pitches have a ratio of 2:1, the spindle nut 17 did not travel exactly to half of the outer threaded spindle 8, because the inner threaded spindle 10 has a greater length than the middle threaded spindle 9 and the outer threaded spindle 8.

The thread pitch ratio of 2:1 also means that, as can be seen in state B of FIG. 3, the inner and middle telescopic tubes 6, 7 have moved out of the outer telescopic tube 5 equidistantly. By attaching the middle telescopic tube 6 to the spindle nut 17, the middle telescopic tube 6 moves relative to the inner telescopic tube 7 only half as fast as the outer telescopic tube 5 moves relative to the inner telescopic tube 7, thus achieving an even, synchronous movement of the telescopic tubes 5, 6, 7 when adjusting the height of the lifting column 2.

State C shows the condition in which both the threaded spindles 8, 9, 10 and the telescopic tubes 5, 6, 7 are fully extended. The transition from state B to state C relates to an extension of a secondary stroke N of the lifting column 2. The secondary stroke N and the main stroke H together result in a total stroke C of the lifting column 2. If a direction of movement of the motor 11 is maintained in state B, in which the first threaded connection is stopped at the upper stop 18, the second threaded connection with the lower efficiency starts moving because the first threaded connection is locked. This results in movement of the outer threaded spindle 8 relative to the inner and middle threaded spindles 9, 10. The inner and middle threaded spindles 9, 10 are at rest in relation to each other during the transition from state B to state C. Since it is still the outer threaded spindle 8 that is driven by the motor 11, the spindle nut 17 continues to move in a direction towards an end of the outer threaded spindle 8 facing the table foot 3.

In state C, the spindle nut 17 has reached the lower end of the outer threaded spindle 8. The lengths of the threaded spindles 8, 9, 10 and their thread pitches are chosen with respect to each other so that in state A the spindle nut 17 is at the end of the outer threaded spindle 8 facing the table top 4 and in state C the spindle nut 17 is at the end of the outer threaded spindle 8 facing the table foot 3. In this way the available height for extending the lifting column 2 is fully utilized.

Also during the transition from state B to state C, the telescopic tubes 5, 6, 7 are moved synchronously with respect to each other. The synchronous movement of the telescopic tubes 5, 6, 7 therefore does not depend on whether the first threaded connection or the second threaded connection is moved to adjust the height of the lifting column 2. This is particularly advantageous, since different aging of the threaded connections can cause the threaded connection with the originally higher efficiency to have a lower efficiency over time than the threaded connection with the originally lower efficiency. This would result in a reverse order of the movement of the threaded connections. However, since the synchronous movement of the telescopic tubes 5, 6, 7 is independent of which threaded connection is being moved, a user who only sees the telescopic tubes 5, 6, 7 from the outside will not notice this.

If the height of the lifting column 2 is to be reduced again, the outer threaded spindle 8 is driven in the opposite direction by motor 11. In this case, the first threaded connection is moved again first, i.e. outer and middle threaded spindles 8, 9 are at rest with respect to each other and are moved relative to the inner threaded spindle 10 in the direction of the table foot 3. This is done until the first threaded connection stops at a lower stop 19. The table foot 3 itself, for example, or an additional stop element, which is attached to the inner threaded spindle 10 in a region of the table foot 3, serves as the lower stop 19. Then, with the drive direction remaining the same, the outer threaded spindle 8 is moved relative to the middle and inner threaded spindles 9, 10. During the entire retraction of the lifting column 2, the spindle nut 17 on the outer threaded spindle 8 moves in the direction of motor 11, i.e. in the direction of the end of the outer threaded spindle 8 facing the table top 4.

FIG. 4 shows the electrically adjustable lifting column 2, as used in FIGS. 1 and 2, in states A, B and C as shown in FIG. 3 in a half-section.

In particular in state A, FIG. 4 shows that, when the lifting column 2 is fully retracted, further retraction of lifting column 2 is not possible because the inner threaded spindle 10 already extends into an area of motor 11.

In addition, two areas X and Y are drawn into the representation of state B in FIG. 4. The area X shows an area in which the spindle nut 17 is located in this state B. Area Y shows an area where the first threaded connection between the inner threaded spindle 10 and the middle threaded spindle 9 is located in this state B. These areas X, Y are shown in detail in FIGS. 5 and 6.

Figure 5:
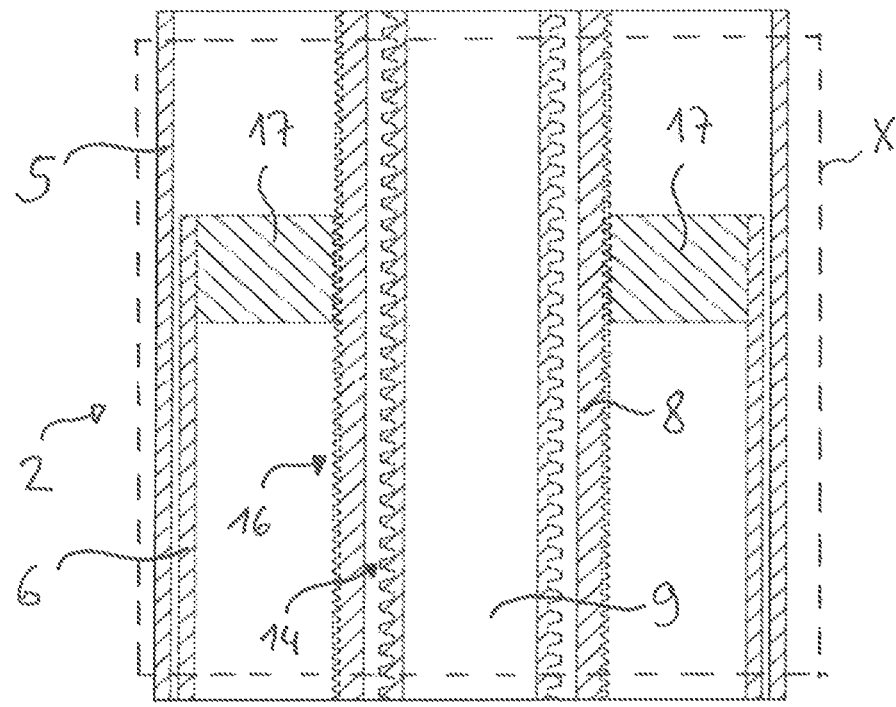
FIG. 5 shows a section of the lifting column as shown in FIG. 4 in a full cut.

FIG. 5 shows a section of the lifting column 2 as shown in FIG. 4 in a full section. FIG. 5 shows the area X according to FIG. 4, in which spindle nut 17 is located in state B. In particular, the engagement of the spindle nut 17 in the third external thread 16 of the outer threaded spindle 8 can be seen here. FIG. 5 also shows the different thread pitches of the third external thread 16 and the second external thread 14. In this embodiment, the spindle nut 17 is flush with the end of the middle telescopic tube 6 facing the table top 4.

Figure 6:
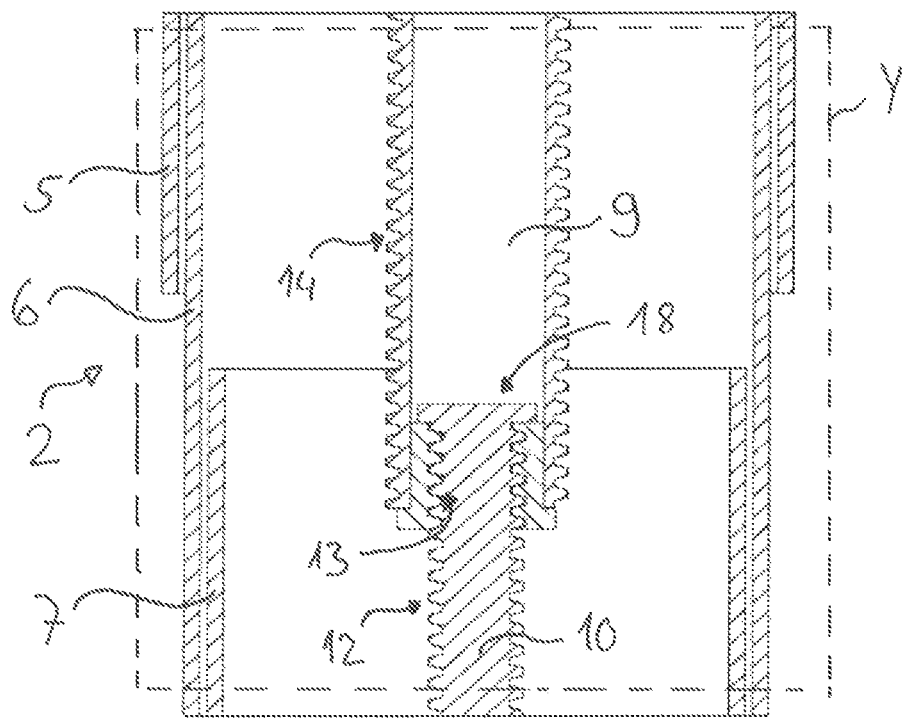
FIG. 6 shows a further section of the lifting column as shown in FIG. 4 in a full cut.

FIG. 6 shows another section of the lifting column 2 as shown in FIG. 4 in a full section. FIG. 6 shows the area Y according to FIG. 4, in which the upper stop 18 of the first threaded connection is located. FIG. 6 shows that the first internal thread 13 of the middle threaded spindle 9 is located only in an area of a lower end of the middle threaded spindle 9 facing the table foot 3. The inner threaded spindle 10 has the upper stop 18, which is T-shaped in profile, at an upper end located inside the middle threaded spindle 9. With this stop 18, the inner threaded spindle 10 abuts against one end of the first inner thread 13 when the first threaded connection has been extended to the upper stop 18. The second internal thread 15 of the outer threaded spindle 8 is designed similar to the first internal thread 13 shown here.

Figure 7:
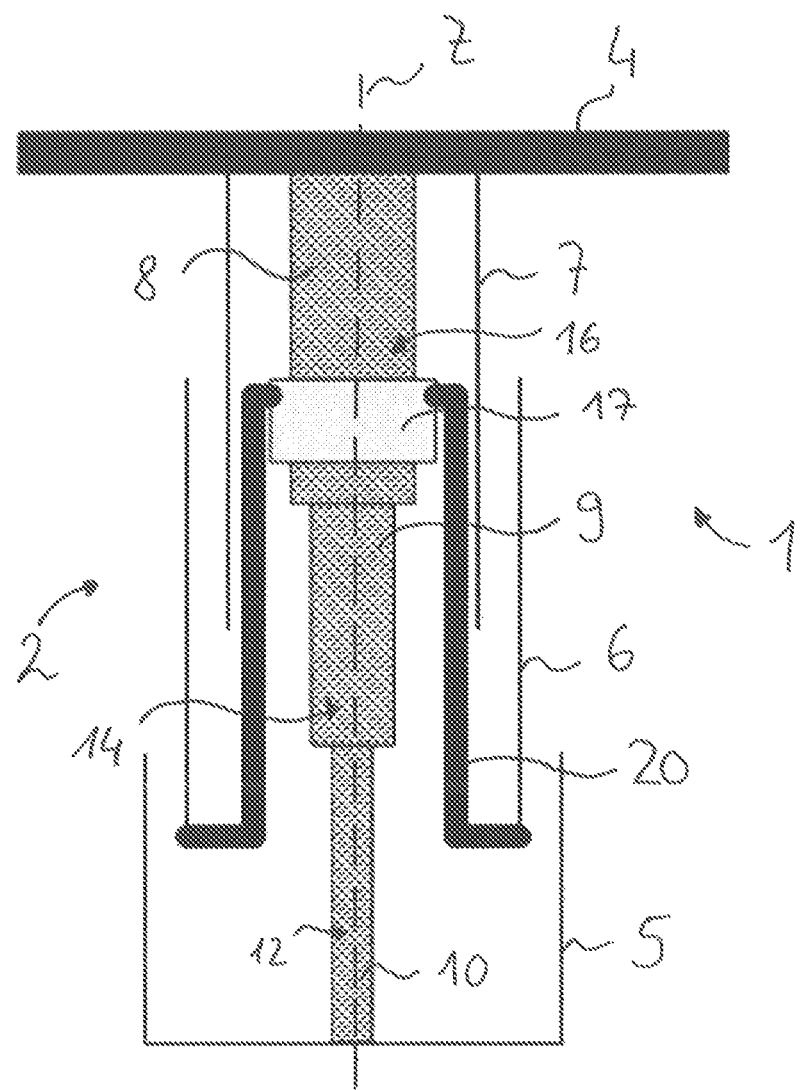
FIG. 7 shows a sectional side view of an electrically adjustable table according to a further embodiment.

According to the figures described here, the telescopic tubes 5, 6, 7 are always arranged so that the outer telescopic tube 5 with the largest diameter is attached to the table top 4 and the inner telescopic tube 7 with the smallest diameter is attached to the table foot 3. Alternatively, it is of course also possible to attach the inner telescopic tube 5 to the table top 4 and the outer telescopic tube 7 to the table foot 3. This is shown in FIG. 7. In this case, since the outer threaded spindle 8 is surrounded by the inner telescopic tube 7, the spindle nut 17 is connected to a lower end of the middle telescopic tube 6 facing the table foot 3, via a holding device 20, for example a tube or rod. In the case of a tube as a holding device, this device, can, for example, be located between the threaded spindles and the telescopic tubes, concentric with them. Alternatively, the spindle nut 17 can be connected directly to the upper end of the middle telescopic tube 6 facing the table top 4 via at least one recess in the inner telescopic tube 7.

I claim:

1. An adjustable lifting column for adjusting a piece of furniture, comprising
    a drive assembly;
    a threaded spindle assembly comprising at least two concentrically arranged threaded spindles, of which an outer threaded spindle concentrically surrounds at least one further threaded spindle;
    a telescopic tube assembly comprising three concentrically arranged telescopic tubes; and
    a driver mechanism with an internal thread;
    wherein
    the threaded spindle assembly is located within the telescopic tube assembly;
    two adjacent threaded spindles of the threaded spindle assembly each have a common threaded connection;
    one of the two adjacent threaded spindles of the threaded spindle assembly is connected to the drive assembly for driving said one threaded spindle;
    the outer threaded spindle further has an external thread in which the internal thread of the driver mechanism engages; and
    the driver mechanism is connected to a middle telescopic tube of the three telescopic tubes.

2. The adjustable lifting column according to claim 1, wherein an outer telescopic tube is fixed to a first end of the threaded spindle assembly, an inner telescopic tube is fixed to a second end of the threaded spindle assembly, the second end being opposite the first end, and the middle telescopic tube is linearly movable along the threaded spindle assembly.

3. The adjustable lifting column according to claim 1, wherein the threaded spindle assembly comprises exactly three concentrically arranged threaded spindles, and a threaded connection between the outer and a middle threaded spindle has a different efficiency than a threaded connection between the middle and an inner threaded spindle.

4. The adjustable lifting column according to claim 3, wherein the threaded spindle assembly is arranged to move the threaded connection with the higher efficiency until a stop and, with a drive direction of the drive assembly remaining the same, then to move the threaded connection with the lower efficiency.

5. The adjustable lifting column according to claim 3, wherein a total stroke of the lifting column is divided into a main stroke and a secondary stroke, wherein the main stroke is adjustable by moving the threaded connection with the higher efficiency and the secondary stroke is adjustable by moving the threaded connection with the lower efficiency.

6. The adjustable lifting column according to claim 5, wherein a lifting height of the secondary stroke is at most as large as a lifting height of the main stroke.

7. The adjustable lifting column according to claim 3, wherein the outer threaded spindle is driven by the drive assembly for adjusting the lifting column.

8. The adjustable lifting column according to claim 1, wherein a thread pitch of the external thread of the outer threaded spindle relates to a thread pitch of the common threaded connections of the concentrically arranged threaded spindles according to a ratio in a range from 1:1.5 to 1:4.

9. The adjustable lifting column according to claim 8, wherein the thread pitch of the external thread of the outer threaded spindle relates to the thread pitch of the common threaded connections of the concentrically arranged threaded spindles according to a ratio of 1:2.

10. The adjustable lifting column according to claim 1, wherein the drive assembly comprises an electric motor and a gear for driving the driven threaded spindle.

11. The adjustable lifting column according to claim 1, wherein the drive assembly comprises an electric motor for directly driving the driven threaded spindle.

12. The adjustable lifting column according to claim 11, wherein the electric motor is arranged to directly drive the driven threaded spindle without a gear.

13. The adjustable lifting column according to claim 1, wherein the threads of all threaded spindles are of the same direction.

14. The adjustable lifting column according to claim 1, wherein the lifting column is arranged to move a load of less than 100 kilograms and the threaded spindle assembly has a spindle diameter of less than 40 millimeters.

15. The adjustable lifting column according to claim 1, wherein a flexible element is arranged between the driver mechanism and the middle telescopic tube, which at least partially compensates a tilting of the middle telescopic tube.

16. An adjustable table system with at least one adjustable lifting column according to claim 1.

* * * * *